United States Patent Office 3,051,651
Patented Aug. 28, 1962

3,051,651
METHOD OF REMOVING OXYGEN DISSOLVED IN WATER BY MEANS OF ANION EXCHANGE RESINS
Karl Haagen, Leverkusen, Germany, assignor to Farbenfabriken Bayer Aktiengesellschaft, Leverkusen, Germany, a corporation of Germany
No Drawing. Filed Feb. 2, 1960, Ser. No. 6,117
Claims priority, application Germany Feb. 12, 1959
5 Claims. (Cl. 210—32)

The present invention relates to a process for removing oxygen dissolved in water by means of anion exchange resins.

The increasing industrial importance of chemically pure water has frequently resulted in an attempt being made to remove from water the atmospheric oxygen which is dissolved therein in addition to electrolytes. It is known to remove electrolytes from water by means of ion exchange resins and an attempt was therefore made to remove the dissolved oxygen from water by means of ion exchange resins.

In order to fix the atmospheric oxygen dissolved in water synthetic resins were employed having groups incorporated therein which could be reversibly oxidised and reduced. Several Redox systems have been incorporated by various methods into synthetic resins and the properties of the resulting Redox exchangers have been investigated and described (see Ullmann, Enzyclopädie der techn. Chemie, 3rd edition, 1955, volume 6, page 477).

However, none of the aforementioned exchangers have so far become of practical importance. Generally speaking, the capacity and the reaction velocity thereof with respect to the atmospheric oxygen dissolved in the water is too low, or the stability of the exchanger or the bonding strength of the Redox systems to the resin structure does not satisfy requirements. The problem of the removal of oxygen dissolved in water by means of reversible Redox systems has thus still not been solved in a practical manner.

In contrast to the aforementioned methods, a process for purifying and removing oxygen from industrial water is known from French patent specification No. 855,849, in which the reversibility of the oxygen absorption is dispensed with. The water is conducted through an ion exchange filter, which has a reducing agent combined therewith in the form of a salt. In another modification of this method, the reducing agent is added to the water beforehand in excess. The oxidation products which are formed and the excess reducing agent are then removed by suitable ion exchangers. The sulphite ion is given as an example of an anionic reducing agent in the aforementioned French patent specification, the sulphite ion being combined with an anion exchanger. However, practical experience shows that oxidation of the sulphite ion to the sulphate ion by the dissolved atmospheric oxygen takes place too slowly at room temperature for the oxygen to be removed from the water in a technically satisfactory manner by this method.

It is an object of this invention to provide a new method for removing oxygen dissolved in water by means of anion exchange resins.

It is a further object to this invention to avoid the disadvantages of the known exchangers abovementioned.

In accordance with the present invention, it has been found that efficient exchange resins for the removal of oxygen dissolved in water are obtained if anion exchangers carrying both strongly basic and weakly basic functional groups are charged with anions of dithionous and sulphoxylic acid.

In the first place, it was found that the combination of a reactive anionic reducing agent, such as the anion of formamidine-sulphinic acid or dithionous acid, with a conventional anion exchanger, still does not result in ion exchange resins which can be satisfactorily used to remove oxygen dissolved in water. The higher activity of these compounds results in a greater instability thereof in aqueous solution, which is particularly apparent in the case where the first-mentioned reducing agent is used, by the formation of gas bubbles in the exchanger bed. It is also not readily possible to obtain satisfactory results with dithionite, because the charging of the exchanger with dithionite must take place in alkaline or ammoniacal solution, since sodium dithionite has a tendency to decompose in neutral and especially in acid solution. It was consequently surprising that the quaternary ammonium salt of dithionous acid, in which form the reducing agent is present in the exchanger, does not decompose during prolonged contact with water.

If a weakly basic anion exchanger is used, the result of the charging is not only dependent on the quantity of reducing agent employed, but also on the quantity of the alkali and on the charging condition of the exchanger prior to the charging with reducing agent. Ammonia is the preferred alkali. If the exchanger is partly in the form of a base, the sodium dithionite solution should be mixed with less aqueous ammonia than when the exchanger is present entirely in the form of a salt. In practice, however, the charging condition of the exchanger is only exactly known prior to the first charging. In the case of all subsequent charges, the base form and the salt form are present in a varying ratio. It is therefore difficult to find the optimum quantity of $NH_3$, but nevertheless it is important to know this, since with an excess of ammonia, the reducing agent taken up by the exchanger is again displaced by $NH_3$ and the exchanger is transformed into the base form, which does not take up any reducing agent from the aqueous sodium dithionite solution.

When working with weakly basic anion exchangers, the aforementioned difficulties can be obviated by converting the exchanger, prior to each charging with dithionite, into a desired condition by treating it with a solution of an ammonium salt. The basic exchanger groups are thereby transformed into the salt form and an equivalent quantity of ammonia is formed in the aqueous solution. The charging with the reducing agent can then always be effected with the constant quantity of a solution of identical composition which has been found to be most suitable.

In spite of this improvement which can be produced by the interposition of a treatment with a solution of an ammonium salt (after the exhaustion of the exchanger or prior to the further charging with reducing agents), the expenditure of dithionite is too high for this process to be economic for the removal of oxygen dissolved in water.

On the other hand, if the dithionite anion is combined with strongly basic groups of an exchange resin, substantially better results are produced as regards the consumption of dithionite, because in this case the dithionite anions taken up by the exchanger are not removed again by ammonia. With equal introduction of dithionite for charging and regenerating the exchanger, the escape of oxygen only takes place after a substantially longer running period of the filter than is the case when using weakly basic exchangers. Consequently, when working with strongly basic exchangers, another disadvantage becomes disturbingly apparent, namely the lowering of the pH value after the filter has been operating for a relatively short time, and this is clearly shown in detail in the comparison experiment given in Example 1. Corresponding to the low solubility of the oxygen in water, the quantity of the acid formed, based on the volume of water, and thus the concentration of the acid which is formed, is very low. However, if a steam boiler is operated with this water, it would have a very disturbing effect because of the concentration in the boiler, for there would be corrosion due to acid instead of corrosion due to oxygen.

Now the unexpected discovery has been made, that after a basic exchange resin containing both weakly and strongly basic groups has been charged with dithionite in accordance with the present invention, the aforementioned disadvantages of the two exchanger types are not perhaps found to exist together, but they are always reciprocally eliminated. Exchangers of this type can be easily and effectively charged with ammoniacal dithionite solution. In this case, the dithionite anion is combined with the strongly basic groups and cannot be removed by excess ammonia, while the weakly basic groups are transformed into the base form, and these groups are able in their turn to combine with the acid formed during the oxidation of the dithionite, so that the discharge constantly remains neutral. In this way gradual decomposition of the exchanger salt of the dithionite by the acid is obviated.

It has furthermore been established that an equally favourable effect can also be produced with a mixture of a strongly basic and a weakly basic exchanger. The strongly basic exchanger is readily charged with dithionite in both a caustic alkali and an ammoniacal sodium dithionite solution, whereas the weakly basic exchanger under these circumstances is converted into the base form.

The resin structure of the resins used for carrying out the method according to the present invention is in principle of no importance; all the usually employed exchange resin elements can readily be used. Condensation resins and polymerisation resins can be employed. Suitable anion resins which may be employed in the process of the present invention are for example: acetaldehyde, formaldehyde, polyalkylene polyamine condensation products, condensation products of aminotriazine, aldehyde and guanido compounds of aminotriazine, aldehyde and strongly-basic non aromatic amines and of biguanide, aldehyde and urea- or melaminealdehyde condensation products of polyepoxy compounds and alkylene polyamines and of furfural and guanido-carbonyl condensation products, condensation products of glycerol dichlorhydrin and alkylene polyamines, condensation product of bifunctional triazines and polyalkylene polyamines, phenol, formaldehyde and tetraethylene pentamine condensation products, phenol, formaldehyde, tetraethylene pentamine and epichlorhydrin condensation products etc.

Suitable polymerisation resins are for example vinyl aromatic polymerisation products such as polystyrene and the like which have been chloromethylated and subsequently reacted with amines in known manner. The preparation of exchange resins of this type for example is described in the German patent applications DAS 1,058,737 and DAS 1,010,738 or German Patents Nos. 848,257 and 829,223.

The chemical nature of the active exchange groups is also not decisive; it is the basicity thereof and the ratio of the two types of basic groups to one another which is of importance. Suitable strongly basic functional groups are quaternary ammonium bases and sulphonium compounds, while the weakly basic groups include primary and/or secondary and/or tertiary amino groups. Suitable resins carrying sulphonium groups are for example aldehyde condensation products based on di- or tri-anisylsulphide. The best possible ratio between the two types of functional groups is about 1:1. However, as will be apparent from the following examples, ratios differing from this also give effective exchanger resins.

The dithionites employed in the practice of the present invention, i.e. for charging the aforementioned exchange resins are preferably the alkalidithionites such as for example sodium dithionite, potassium dithionite, ammonium dithionite and the like. Furthermore it has been found that the reaction product of sodium dithionite with formaldehyde (sodium formaldehydesulphoxylate) can be combined with strongly basic exchanger groups and the resulting product has the same properties of chemically combining with oxygen dissolved in water. In contrast to sodium dithionite, the sodium formaldehyde sulphoxylate can be dissolved in water without the concurrent use of alkalis.

Charging the anion exchanger resins containing both strongly and weakly basic functional groups is performed by treating these resins with aqueous ammonia containing solutions of the dithionite. Preferably these solutions should contain 1 to 15 parts by weight of dithionite and such a quantity of ammonia which is nearly equivalent to the amount of weakly basic groups of the resins being contacted with. By means of this procedure the weakly basic exchanger groups are transformed into the base form. The excess ammonia does not in this case cause any reduction in efficiency of the exchanger. Instead of ammonia also lower primary or secondary aliphatic amines may be used. The temperature of about 15 to 25° C. should be observed.

After exhaustion, the exchanger can be immediately regenerated by means of ammoniacal dithionite solution as aforementioned and it does not have to be ttreated with ammonium salt solution. By using the exchangers according to the present invention, which contain both strongly basic and weakly basic groups, not only is a neutral discharge obtained but also a substantial improvement in the filter efficiency as compared with exchangers containing only strongly basic groups and having the same dithionite charge.

In the method according to the present invention the water to be freed from oxygen must be freed from electrolytes prior to being treated with the exchange resins since the dithionite anion fixed in the form of a salt on the exchanger can be exchanged for other anions in the presence of electrolytes. As a consequence of this, the method can only be carried out in a neutral medium, and not in an acid or alkaline medium. Electrolyte-free neutral water, can, however, be readily obtained in practice by various methods. The temperature during the exchanging process should not exceed 15–35° C.

The method according to the present invention enables atmospheric oxygen to be removed economically from water. Water which has been treated by the method according to the present invention is not contaminated with excess reducing agents or oxydation products thereof and is accordingly especially suitable for use as a solvent, in polymerisation processes, and for the generation of high-pressure steam.

The following examples show the advantage of using mixed basic exchanges or mixtures of strongly and weakly basic exchangers for the removal of oxygen from water saturated with air, the salts having previously been removed from the water by conducting well or spring water over a cation exchanger in H-ion form and then over an anion exchanger in base form. As indicator for the escape of oxygen there is employed an ion exchanger which is charged with leucomethylene blue and which can be inserted, in a glass tube, into the discharge pipe of the filter (see Sansoni, Zeitschrift für Elektrochemie, 57,213 (1953)). The occurrence of blue colouring indicates that the exchanger charged with dithionite has become exhausted.

Example 1

For this experiment, there was employed a mixed basic exchanger which had been obtained by condensing phenoxyethyl chloride with tetraethylene pentamine. A partial quaternisation of the weakly basic groups was produced by methylation with dimethylsulphate. Cross-linking of the intermediate product was effected with formaldehyde in concentrated sulphuric acid solution.

The exchanger had a capacity of 1.2 millival. per cc. of the exchanger swelled in the salt form. About 60% of this capacity was made up of strongly basic groups and the remainder of weakly basic groups. 25 cc. of this exchanger having a grain size of from 0.3 to 0.5 mm. were placed in a small blast tube having a diameter of 12 mm. and which had been charged with 25 cc. of a solution of 2.5 g. of sodium dithionite ($Na_2S_2O_4$) in 2.0 cc. of 20% $NH_3$. The exchanger was then washed with water until the discharge was neutral. Salt-free water saturated with air was then passed through the exchanger. The filter was initially in operation continuously for 49½ hours. During this time 11.7 litres of water had passed therethrough. After a stoppage of 3 days, the filter was again set in operation. During the course of another 32¾ hours, another 7.3 litres of water were freed from oxygen. The escape of oxygen with a throughput of 19 litres of water was effected in 82 hours. The variation of the pH value of the discharge is shown in the following table:

| Water throughput, cc.: | pH value of the discharge |
|---|---|
| 790 | 6.5 |
| 6450 | 6.5 |
| 9535 | 6.45 |
| 11210 | 6.05 |
| 12350 | 6.4 |
| 16485 | 5.05 |
| 18450 | 3.65 |

The exchanger was thereafter recharged with 25 cc. of a 10% $Na_2S_2O_4$ solution containing 1.6% $NH_3$. After washing the exchanger, air-saturated water was again passed therethrough. The discharge still had a pH of 6.05 after 17 litres of water had passed through the exchanger. Escape of oxygen took place at a pH of 3.6 after 20 litres of water had passed through the exchanger.

For comparison purposes, there is given below details of the removal of oxygen from deionised, air-saturated water with the aid of the dithionite of an exchanger which only contains strongly basic groups.

25 cc. of a water-swelled, strongly basic exchanger having a grain size of from 0.3 to 0.5 mm., and containing about 0.7 millival. of strongly basic nitrogen groups per cc. of the swelled exchanger, were placed in a glass tube (layer height 21.6 cm.) and charged with 25 cc. of an ammoniacal sodium dithionite solution containing 2.5 g. of technical $Na_2S_2O_4$ and 0.51 g. of 100% $NH_3$. After washing the solution, salt-free water which had previously been saturated with air was passed through the tube. The pH value of the water running in was about 6.6. In the course of 4 days and with an operating period of 26 hours, altogether 13 litres of water ran through the filter until the escape of oxygen took place. The average hourly throughput of 500 cc. of water corresponds to a specific loading $$\left(=\frac{\text{vol. of exchanger}}{\text{throughput per hour}}\right)$$

of 1:20. The removal of the oxygen from the water by the dithionite salt of the anion exchanger is thus effected just as quickly as the ion exchange at strongly dissociated exchanger groups. Constant checking of the pH value showed that even after the passage of 1.5 litres of water, the discharge was somewhat more acid (pH 5.8) than the inflow. After a throughput of 12 litres of water, the pH value of the discharge had fallen to 3.75. The lowering of the pH value of the water on passing through the filter is to be attributed to the fact that, with the oxidation of the $S_2O_4$ ion, free sulphuric acid or sulphurous acid is formed in the same proportion as that in which oxygen is removed from the solution.

This comparison experiment shows that with the same quantity of reducing agent a far longer running period is obtained for the filter when an exchanger having both weakly basic and strongly basic groups is employed than in the case of an exchanger which contains only strongly basic groups. However, it is further apparent from the table given in Example 1 that the weakly basic groups are exhausted before the dithionite combined with the strongly basic groups is completely oxidised. When the ratio between the strongly basic groups and the weakly basic groups is 1:1, an even more favourable result is consequently to be expected than when the ratio is 3:2. The strongly basic exchanger employed in the comparison experiment was prepared as described in German patent specification No. 959,947 by condensing phenoxyethyl trimethyl ammonium chloride and diphenyl ether with formaldehyde in concentrated sulphuric acid solution.

*Example 2*

The use of a mixture of a strongly basic exchanger and a weakly basic exchanger.

18 cc. of a strongly basic exchanger as described in Example 1 and 10 cc. of a weakly basic exchanger (capacity 1.7 millival. per cc., grain size from 0.3 to 0.5 mm.), prepared by cross-linking a condensation product of phenoxyethyl chloride and tetraethylene pentamine with formaldehyde, were mixed together. The mixture was placed in a glass tube and charged with a solution of 2.5 g. of $Na_2S_2O_4$ in 25 cc. of 2.4% ammonia. Air-saturated salt-free water was conducted through the filter after it had been washed with 150 cc. of electrolyte-free water. 11.6 litres of water had run through the filter after 27 hours. The pH values of the discharge were between 6.5 and 6.8 during this period. After an interruption of 66 hours, the filter was again placed in operation. After another running period of 34 hours and a throughflow of 7.9 litres of water, the escape of oxygen took place at a pH value of 6.9. Thus, 19.5 litres of water had run through the filter in 61 hours, the reaction having remained neutral until the escape of the oxygen.

The exchanger mixture was then regenerated with a solution of only 2 g. of $Na_2S_2O_4$ in 20 cc. of N/1 caustic soda solution. After washing the solution, 14.3 litres of water were conducted through the filter until oxygen escaped, which occurred after 45 hours. The pH value of the discharge at the commencement of operation was 7.9 and at the time of escape of oxygen 7.0. It was therefore somewhat higher than in the case of the first flow.

In the subsequent regeneration, 15 cc. of $$\frac{n}{1}/\text{caustic soda}$$

solution were initially passed through the filter. After brief flushing with water, regeneration was effected with a solution of 2.0 g. of $Na_2S_2O_4$ in 25 cc. of 1.6% ammonia. After washing with 200 cc. of water, air-saturated water was caused to flow through the tube. The pH value in this experiment was somewhat lower from the outset (pH 6.45) and was still 6.75 at the time of escape of the oxygen after 15.7 litres of water had flowed through the tube in 74 hours.

The preparation of anion exchange resins of the type used in the foregoing examples is described in the German Patents Nos. 1,031,964 and 959,947.

Instead of the aforementioned resins without disadvantages also anion exchange resins may be employed which are based on the chloromethylation products of high molecular weight polymers. Preparations of such anion exchange resins are described in the German patent applications Nos. 1,058,737 and 1,010,738. The chloromethylated products obtained by these methods can be subjected to amination according to well known methods as they are, for instance, disclosed in U.S. patent specification No. 2,591,573.

In the process of the present invention further there may be employed anion exchange resins as described in the German patent application No. 1,045,102. This application represents a process for producing anion exchangers by haloalkylating cross-linked aromatic vinyl copolymers and aminating the haloalkylated cross-linked vinyl aromatic copolymers. According to this cross-linked vinyl aromatic copolymers are used which are produced by copolymerizing a monovinylaromatic compound and a cross-linking agent which is copolymerizable with said monovinylaromatic compound in the presence of an organic liquid which is a solvent for said monovinylaromatic compound and said cross-linking agent but not for linear vinyl aromatic polymers, said organic liquid being applied in quantities amounting to at least 20% based on the weight of the aforementioned monomers.

What we claim is:

1. A method of removing oxygen dissolved in water by means of anion exchange resins, which comprises conducting water containing dissolved oxygen through an anion exchange resin containing both weakly basic and strongly basic functional groups and the strongly basic groups thereof being charged with an anion selected from the group consisting of dithionous acid and a reaction product of dithionous acid with an aldehyde.

2. A method as claimed in claim 1 wherein an anion exchange resin is used containing quaternary ammonium groups as strongly basic groups and containing weakly basic groups selected from the group consisting of primary amino groups, secondary amino groups and tertiary amino groups.

3. A method as claimed in claim 1, wherein the ratio of weakly basic to strongly basic functional groups is about 1:1.

4. A method as claimed in claim 1, wherein a mixture of a strongly basic anion exchange resin and a weakly basic anion exchange resin is employed.

5. A method as claimed in claim 1, wherein the exhausted exchangers are regenerated with aqueous alkali or ammoniacal dithionite solution containing such a quantity of alkali or ammonia that the weakly basic exchanger groups are converted into the base form.

References Cited in the file of this patent

UNITED STATES PATENTS 2,565,354    Cohen _____ Aug. 21, 1951

FOREIGN PATENTS 855,849    France _____ Feb. 26, 1940

OTHER REFERENCES

Mills et al.: "Oxygen Removal from Water by Ammine Exchange Resins," Industrial and Engineering Chemistry, vol. 41, No. 12, December 1949, pages 2842–2844. (Copy in Scientific Library.)